(12) United States Patent
Raess

(10) Patent No.: US 6,419,396 B1
(45) Date of Patent: Jul. 16, 2002

(54) BEARING

(76) Inventor: Ulrich Raess, Adlikerstrasse 71, CH-8105 Regensdorf (CH)

( * ) Notice: Subject to any disclaimer, the term of this patent is extended or adjusted under 35 U.S.C. 154(b) by 0 days.

(21) Appl. No.: 09/582,857

(22) PCT Filed: Jan. 6, 1998

(86) PCT No.: PCT/CH98/00003
§ 371 (c)(1),
(2), (4) Date: Aug. 14, 2000

(87) PCT Pub. No.: WO99/35413
PCT Pub. Date: Jul. 15, 1999

(51) Int. Cl.$^7$ .............................................. F16C 32/06
(52) U.S. Cl. ...................................................... 384/107
(58) Field of Search ................................ 384/100, 107, 384/111, 112, 113

(56) References Cited

U.S. PATENT DOCUMENTS

| | | | |
|---|---|---|---|
| 3,472,565 A | | 10/1969 | Arneson ..................... 384/113 |
| 3,785,708 A | * | 1/1974 | Miyasaki .................... 384/111 |
| 3,827,767 A | | 8/1974 | Sinner ........................ 384/113 |
| 4,206,953 A | | 6/1980 | Diehl et al. ................. 384/113 |
| 4,836,692 A | * | 6/1989 | Hagen ......................... 384/107 |
| 5,073,036 A | * | 12/1991 | Sutton ..................... 384/100 X |
| 5,073,037 A | * | 12/1991 | Fujikawa et al. ........... 384/120 |
| 5,553,948 A | * | 9/1996 | Ito ............................. 384/107 |
| 6,019,515 A | * | 2/2000 | Fujii et al. .................. 384/107 |

FOREIGN PATENT DOCUMENTS

| | | |
|---|---|---|
| DE | 1 425 968 | 10/1969 |
| DE | 1 965 580 | 7/1970 |

* cited by examiner

Primary Examiner—Thomas R. Hannon
(74) Attorney, Agent, or Firm—Rankin, Hill, Porter & Clark LLP

(57) ABSTRACT

The invention relates to a bearing for a shaft with a high speed characteristic, which takes up external forces acting on the shaft, wherein a one-piece hydrostatic bearing (2) is provided for taking up axial and radial forces at a high speed characteristic and a shaft (3) to be mounted is mounted by the pressure medium of water without contact, a bearing body has several channels (17,20,21), these channels end in jets (18,22,23) and between the jets (18,22, 23) and a shaft (3) to be mounted and/or other elements (4) is located a gap (19,24,25) with different heights (H,h), wherein water flows through these jets and mounts the shaft (3) to be mounted by a film of water. The total force of this bearing is taken up by a flange bolted to the machine tool.

11 Claims, 5 Drawing Sheets

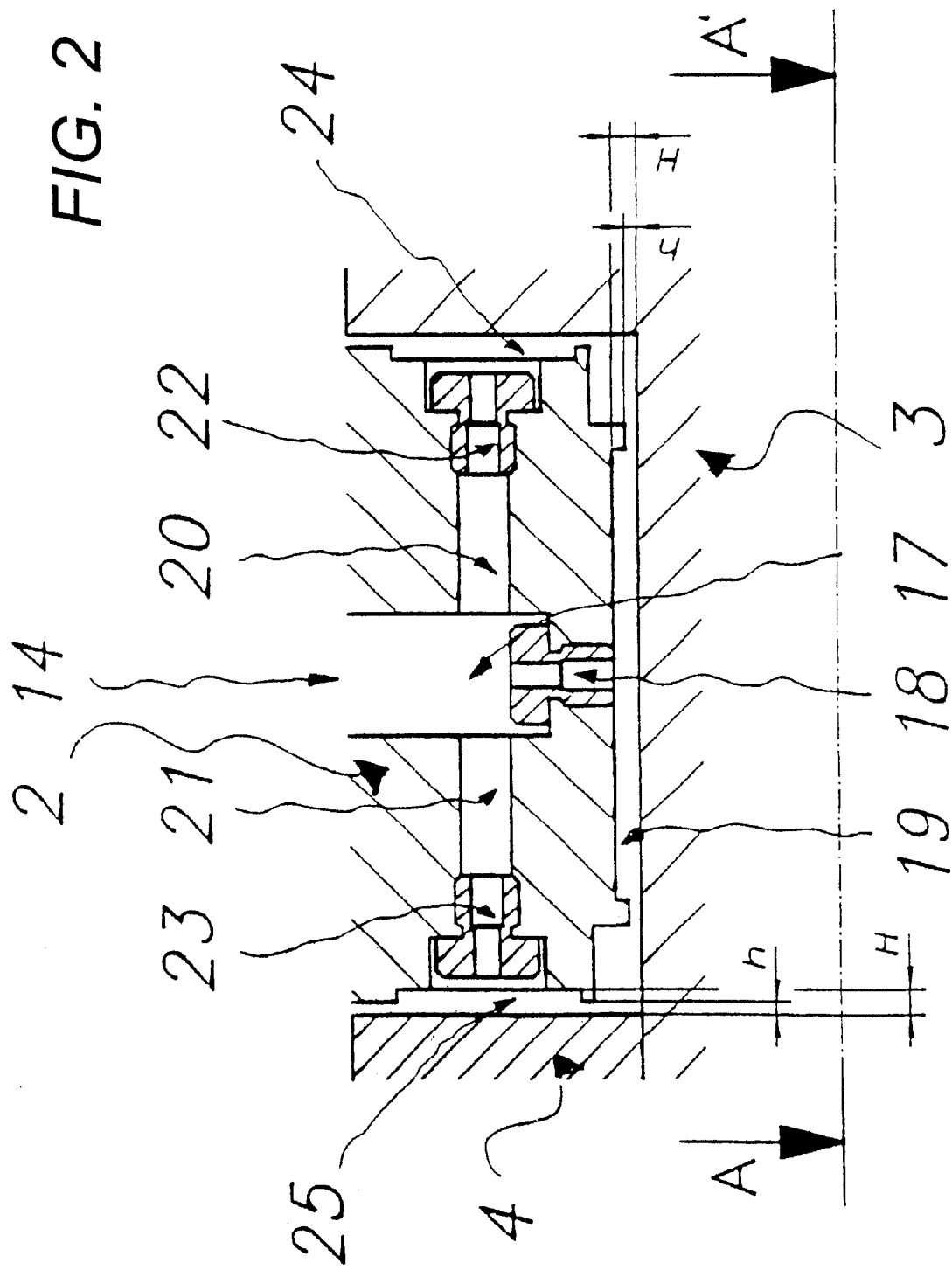

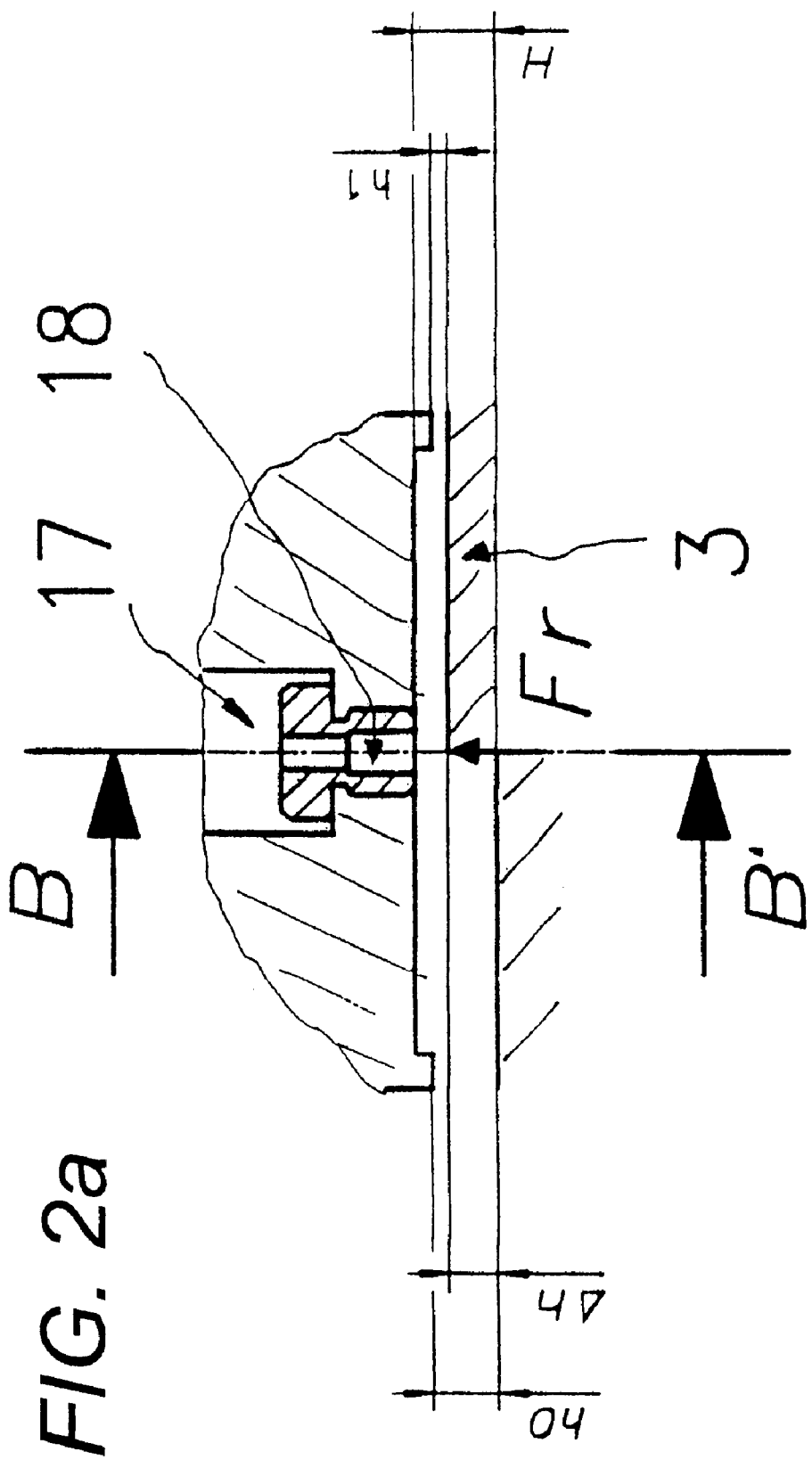

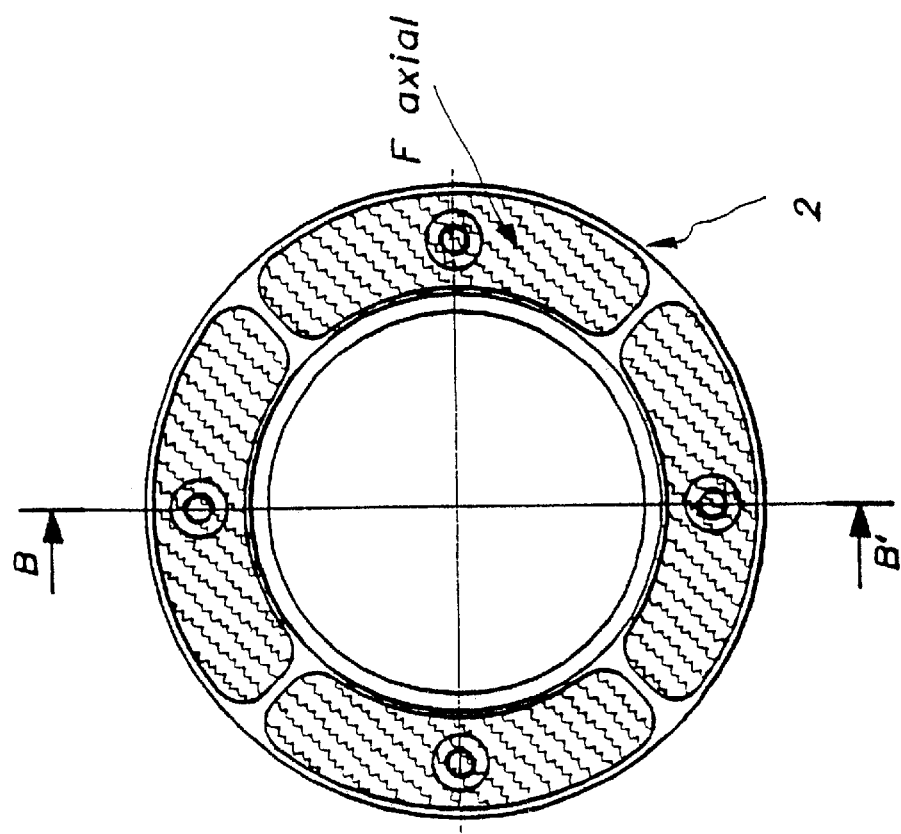
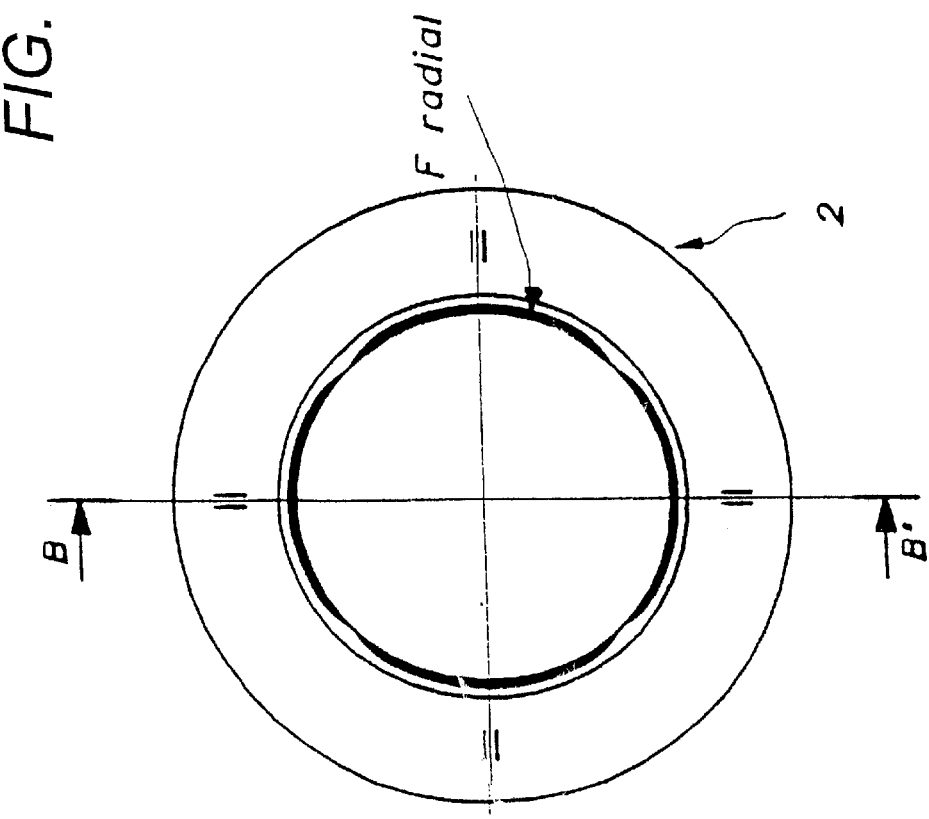
FIG. 3

BEARING

BACKGROUND OF THE INVENTION

The present invention generally relates to bearings and, more particularly, relates to bearings for grinding and milling spindles in machine tools for machining technology.

As is known, machine tools are used for machining components such as metal component. Such machine tools often have a grinding or milling spindle that is driven by a high-speed motor. The work spindle can be connected to an adapter for receiving a work piece or a tool.

Such work spindles of machine tools are guided by means of bearings. These bearings perform many functions. The bearings give the components intended for performing the cutting and advance movements an exact path of movement. The bearings also carry the weight of the spindle shaft and surrounding components and they take up operating forces that arise, without vibrations. Therefore, high rigidity and high damping capacity perpendicular and parallel to the guide path is necessary. In order to obtain a high permanent accuracy when performing grinding and milling movements, there are also demands on the spindle shaft guide means for low frictional forces, low wear, good clearance adjustment capacity and protection from chips, cooling water, dirt and damage.

In practice, high-speed spindles in machining technology work within a range of 20–100,00 revolutions per minute. Such work spindles are guided on conventional ball and roller bearings, magnetic bearings and hydrostatic bearings. Usually the speed characteristics, formed from diameter in mm times speed in r.p.m. (D×n), give a greater insight into the prevailing speed conditions. Thus, the range of roller bearings is at a speed characteristic rather below 2.5 million and the range of hydrostatic bearings is rather over 2.5 million.

Ball bearings are less well suited to the working range at high speeds. They are very bulky and so restrict mounting in the machine tool. In order to meet the requirements for low friction at high speed with ball and roller bearings and take up axial and radial forces, often there are several small ball bearings for each taking up an axial or radial force component.

Such ball or roller bearings exhibit punctiform and linear pressure contact with the work spindle. They, therefore, have linear rigidity, which under instantaneous loads can lead to tilting and deflection and other drawbacks resulting therefrom. This impact sensitivity essentially determines the relatively short lifespan of ball and roller bearings. To reduce the impact sensitivity, further stabilizing bearings are provided. All these drawbacks make it uneconomical to use ball and roller bearings with the present-day, ever increasing requirements of the cutting speeds.

Magnetic bearings are capable of use only to a limited extent for application in a milling tool. High forces are generated in milling, which requires a high load-carrying capacity and high radial and axial rigidity of the bearing. A drawback of magnetic bearings is that they are relatively soft and capable of carrying only low loads. Also they are very expensive and elaborate to control only by electronics.

Hydrostatic bearings with a pressure medium of hydraulic oil are used preferably in machine tools which work in the lower speed range. A drawback for use in high-speed machine tools is that the oil, owing to its high viscosity, generates frictional heat and poorly conducts away the frictional heat produced. Also, hydrostatic bearings take up force components in one direction only.

SUMMARY OF THE INVENTION

It is an object of the present invention to provide a bearing, for example for use in machine tools for machining technology, which eliminates the above-mentioned drawbacks. In particular the bearing is to have a simple and compact structure and it is to be economical to procure and maintain. The bearing is to be compatible with common methods of the tooling industry and capable of integration.

The invention provides a single bearing for taking up the force components arising. Preferably, the bearing is formed in one piece and takes up axial and/or radial force components that arise on a shaft and adjoining elements. This is a departure from known constructions where several separate bearings are used for such purposes.

By using a single bearing, the movement of the shaft in the bearing can be compared with a gyratory movement, The center of the shaft in the region of the bearing forms the supporting point of the gyroscope. This is why gyroscopic equations can be used to describe the movement and to allow for precession and nutation. As a result of movement analyses, the bearing is provided with specially arranged bearing regions that effectively compensate for precession and nutation of the shaft.

By using a single, preferably one-piece bearing, a compact design is made possible. This in turn allows use at high-speed characteristics of >2.5 million. The present invention can thus be used in a high-speed machine tool for machining technology, advantageously with direct power transmission via only one flange of the shaft to a machine tool.

The bearing is advantageously hydrostatic and runs on water. Thus, the present invention makes it possible to prestress the bearing with turbulently flowing water which flows through jets into a bearing gap between shaft and bearing, in the inoperative state of the shaft. The shaft is mounted with areal rigidity by means of the film of water. The bearing gap allows compensation of the external forces acting on the spindle shaft, with prestressing of the bearing unit. This, therefore, allows hydrostatically controlled compensation of the forces applied to the bearing from the outside. In particular, the gap width can be controlled by compartment pressure in a simple and uncomplicated manner, without disturbing resonances and/or an increase in amplitude of the shaft occurring during operation.

BRIEF DESCRIPTION OF THE DRAWINGS

These and further features of the present invention will be apparent with reference to the following description and drawings, wherein:

FIGS. 2 and 2a show the principle of operation of the bearing outlined according to FIG. 1;

FIG. 3 shows the arrangement of opposite regions of a bearing according to FIGS. 1 and 2;

DETAILED DESCRIPTION OF THE PREFERRED EMBODIMENTS

Figure 1:
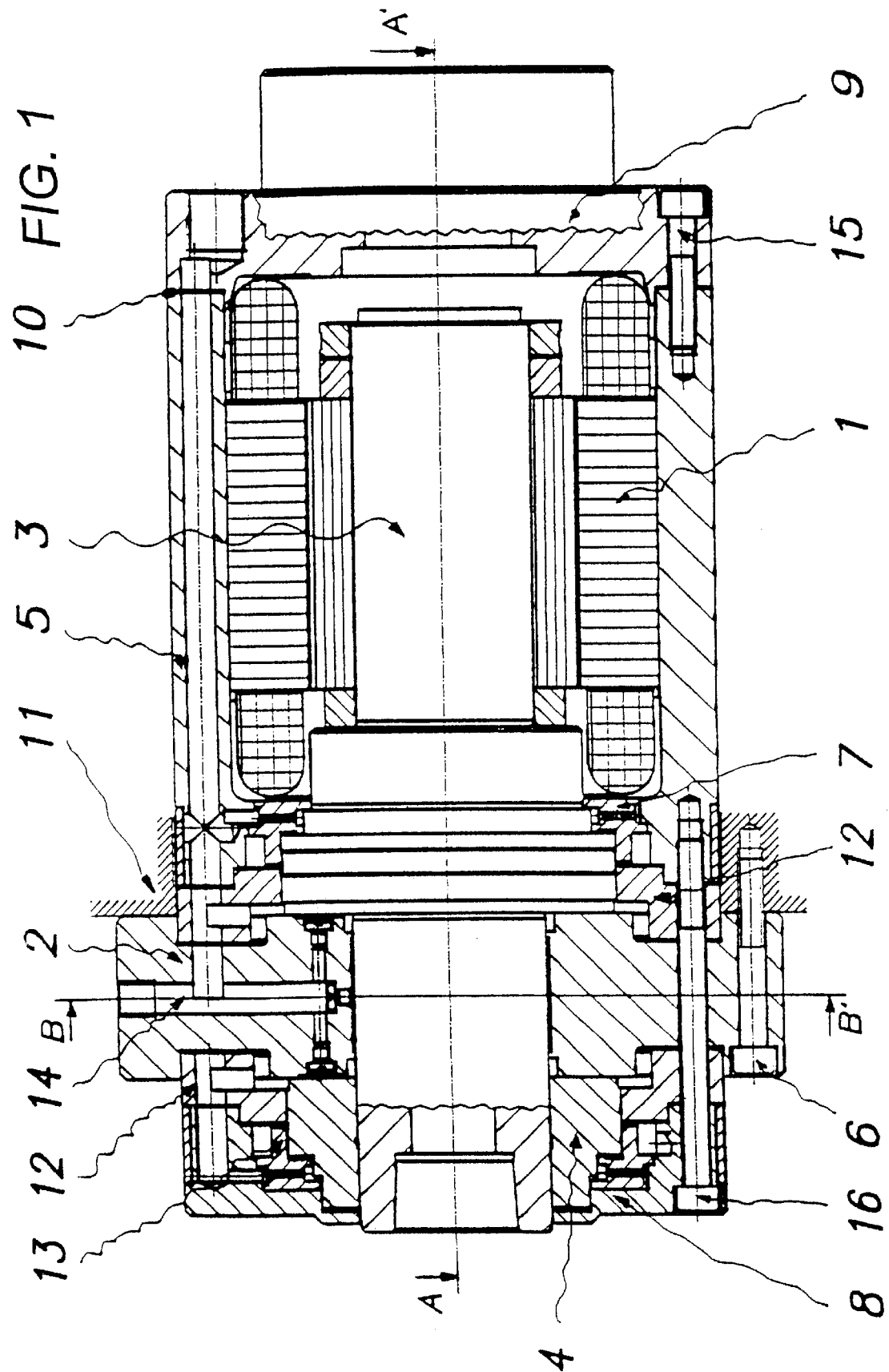
FIG. 1 shows a general view through part of a preferred embodiment of a machine tool with a work spindle and with a bearing in vertical section.

FIG. 1 shows the general view of part of an exemplary embodiment of a bearing 2 according to the invention in exemplary use in a machine tool with spindle shaft 3, with pressure supply flange 9, a housing 5 with high-frequency motor 1 and a first flange 4. Naturally, other applications of the bearing are possible, these are freely available to the expert knowing the present invention and will not be described further hereinafter.

By means of the spindle shaft 3 with axis AA' the rotor of the motor 1, the bearing 2 and a first flange 4 adjoining the bearing 2 at the face are connected to each other. On the side facing away from the flange, the pressure supply flange 9 is bolted with bolts 15 to the housing. These bolts are located in the outer region of the pressure supply flange 9.

The bearing 2 with axis BB' is preferably a hydrostatic bearing. This bearing 2 takes up, via the shaft 3, radial and axial forces and, via the element adjoining the bearing 2 at the face or first flange 4, axial forces that are transmitted when producing cutting and shaping movements of the rotating components. Preferably, water is used as the medium for operating the hydrostatic bearing 2.

In a motor housing 5 is located the motor unit 1 whose rotor is directly connected to the spindle shaft 3 for example by a shrink fit and later sets the latter in rotation. The length of the section of the spindle shaft on which the bearing 2 is arranged is smaller than the region of the spindle shaft that is enclosed by the rotor of the motor 1. The stator of the motor surrounds the rotor. The pressure supply flange 9 enables the pressure medium to be supplied and conducted away via the seal 10.

The hydrostatic bearing 2 is sealed off from the motor housing and from the outside by labyrinths 7 and 13. In particular the hydrostatic bearing 2 consists of a one-piece body in the exemplary form of a flange with supply channel 14 at the end of which are located several channels. A detailed description of the bearing 2 and its elements is given in the description according to FIGS. 2 and 2a. This one-piece body transmits the forces to the next assembly such as, for example, to the machine tool 11 and is bolted by bolts 6 on to the machine tool. The expert knowing the present invention is at liberty to make the bearing body in several pieces, and this may be necessary for reasons of assembly, for example.

The diameter of the spindle shaft 3 is increased in the region of contact between bearing and motor, so that over this area the axial forces that are generated in particular by the weight of the motor can be taken up by the bearing via the spindle shaft. A cover 8 is seated on the flange 12, which is. attached by bolts 16 to the housing 5 by the bearing flange 2.

Due to the simple and compact design of the bearing 2, a high-speed motor is directly connected to the spindle shaft and the hydrostatic bearing 2 works without contact in the range of high-speed characteristics. The term "without contact" means that the spindle shaft 3 has no contact with the bearing material. Since shaft and bearing work without contact, a long life can be expected.

FIGS. 2 and 2a show the principle of operation of the hydrostatic bearing 2 according to FIG. 1. The supply channel 14 of the bearing 2 has several channels. A first channel 17 forms the continuation of the supply channel. This channel 17 ends in a jet 18 that is a fixed input choke. Further channels 20, 21, which branch off from the first channel, end in jets 22,23 that are also fixed input chokes. These jets 18,22,23 by means of known techniques open to the outside, i.e. to the spindle 3 or to the first flange 4. Between jets 18,22,23 and spindle shaft 3 and/or other elements such as, for example, the first flange 4, is located a gap 19,24,25 with different widths H and h. The medium of water flows through this gap 19,24,25 during the phase of operation.

Advantageously, the water flows through these jets. The mounting of the spindle shaft 3 shown by way of example thus functions by means of a film of water which forms in gaps 19,24,25 between jets 18,22,23 and spindle shaft 3 as well as first flange 4.

The high rigidity of this bearing 2 is advantageously ensured by the fact that bearing regions arranged in a ring in the bearing take up the axial and radial forces. Advantageously, three to eight bearing regions are arranged at a distance from each other and advantageously designed in one piece without dividing channels. The absence of dividing channels counteracts a loss of rigidity.

First bearing regions which point largely perpendicularly to the axis AA' of the spindle shaft 3 take up forces acting radially on the spindle shaft 3. Further bearing regions which point largely parallel to the axis AA' of the spindle shaft 3 take up axially acting forces. This bearing 2 thus takes up radial and axial forces via first bearing regions from the spindle 3 and takes up axial forces via further bearing regions from the flange 4 and retransmits these forces via the further flange 2 which is connected to the machine tool 11. These bearing regions are mounted in an optimum manner as a result of analysis of the equations of movement of the shaft.

A first channel 17 forms along the axis BB' the continuation of the supply channel 14 in the direction of the spindle shaft 3. The other two channels 20,21 extend out of the lower region of the supply channel perpendicularly from the latter. These channels end via a jet opening 22,23 in each case also in gaps 24, 25. One channel 21 is oriented on the flange side, the other channel 20 on the motor side. These gaps 19,24,25 are filled with water and enable taking up the radial and axial forces which during tool working, on the one hand, are transmitted to the flange and, on the other hand, take up the axial forces which are transmitted via the spindle shaft. On account of the high acting forces, which arise during the grinding or milling operation, high surface rigidity of the bearing is required and is achieved by the pressure medium of water. Water is distinguished by a suitable modulus of elasticity of approx. $2.1\,10^{*5}$ N/cm$^2$ and a suitable kinematic viscosity of 1.0 mm$^2$/s at 20° C. Naturally, other pressure media are freely available for use by the expert knowing the present invention, which have similar properties to water in relation to modulus of elasticity and viscosity. For example, glycerine might be mentioned as an example here.

The bearing 2 is prestressed by water pressure in the inoperative state. Contact between the shaft 3 and the solid material of the bearing 2 is only via water and is described as without contact and hence free from friction.

With constant pump pressure and turbulent flow set by the fixed input choke, the water passes into the main gap 19, 24, 25 with the exemplary height H (H=100×h). The water flows laterally through a gap h, which is largely perpendicular to the latter, as can be seen in FIG. 2, back out through a return channel. The flow rate and the quantity of water are also maintained when the bearing works under load. Knowing the present invention, the expert is at liberty to choose other dimensions and ratios of gap height and compartment width.

During operation, the external axial and radial forces act on the bearing 2. An examination of the region of radial force action shows by way of example in FIG. 2a how the bearing works under the action of force.

The shaft 3 presses with the external force $F_r$ along the axis BB' on the small gap $h_o$. Under the effect of the force, the gap h decreases its distance from the shaft 3 by delta h. This decrease in gap height reduces the quantity of water flowing away and increases the compartment pressure in the larger gap region H. This pressure increase counteracts the external force $F_r$ which causes the gap reduction. The gap, therefore, automatically becomes larger again and the compartment pressure in the bearing decreases. The pressure compensation described works without friction and for this reason causes hardly any heat generation. Due to circulation of the water, which continues flowing with turbulent flow, an increase in temperature of the bearing is avoided.

In FIG. 3 can be seen an exemplary arrangement of the bearing 2 around the work spindle 3. FIG. 3 is based on the previous description and refers to it. The bearing 2 is located in a ring around the work shaft 3. According to the section BB' there is compensation of a radial force action $F_r$ via several first bearing regions which are located largely radially to the axis AA' of the shaft 3. According to the section AA' there is compensation of an axial force action $F_a$ via several additional bearing regions which are located largely axially to the axis AA' of the shaft 3.

Figure 4:
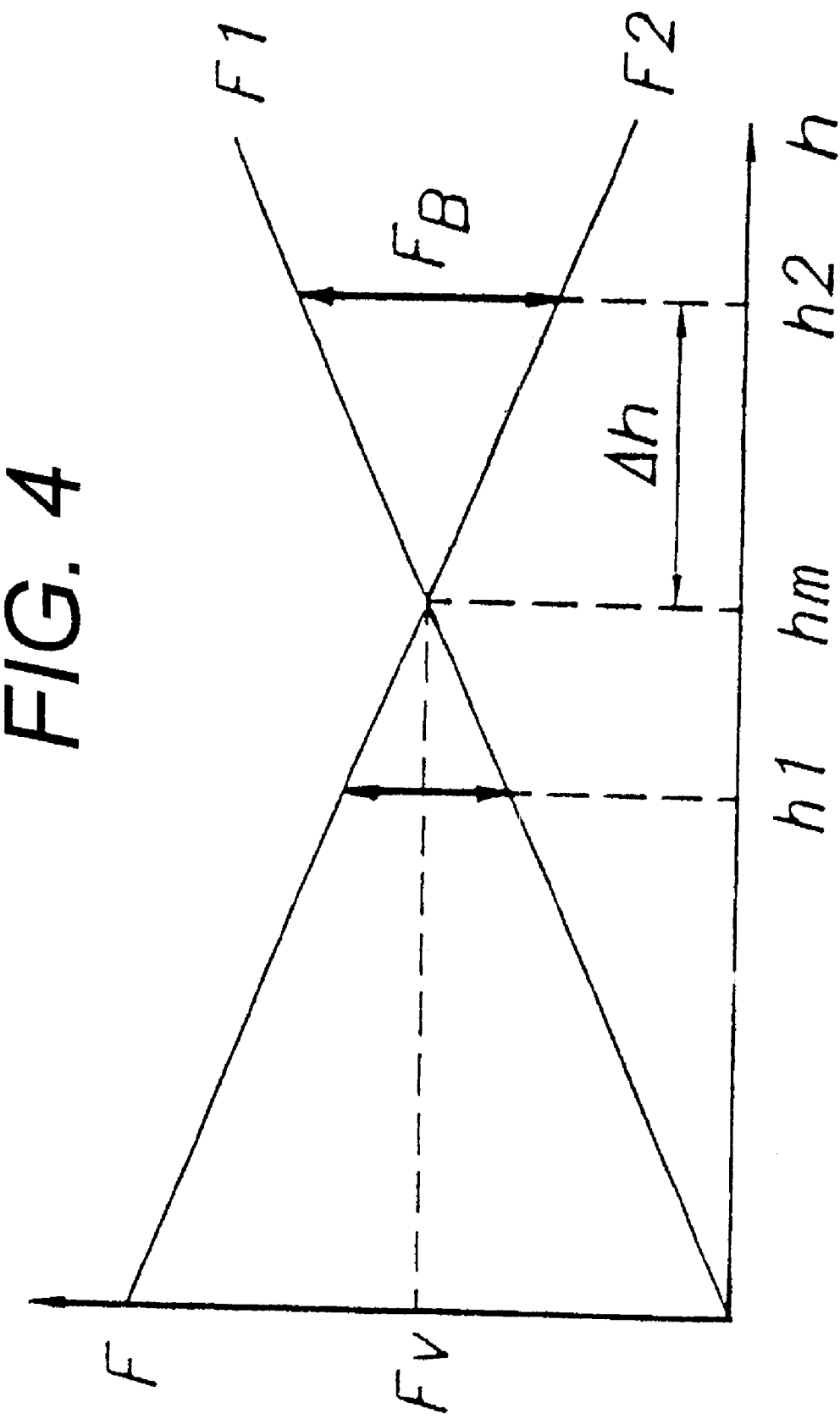
FIG. 4 shows force conditions occurring as a function of the gap height of two regions of a bearing according to FIGS. 1 to 3.

FIG. 4 shows a graph in which can be seen the force ratios of two mutually opposed regions of the bearing 2 by way of example. FIG. 4 is based on the previous description and refers to it. The gap width h of the bearing regions varies as a function of the acting external force F. The force axis point upwards and is marked F. The axis of the gap height is drawn to the right and called h. If the external force $F_1$ rises in a first bearing region as an example then, to an equal extent, the force $F_2$ falls in an opposite bearing region, for example in a second bearing region. At the point of intersection of the two graphs can be read the central position of the gap $h_m$ which arises during the phase of prestressing $F_v$ in both regions of the bearing 2. An operating force $F_B$ arises during operation of the rotating shaft 3 and is the sum of the external force and the compartment force that builds up in the bearing 2. With this operating force the new gap height deviates by a delta h from the central position of the gap $h_m$. To the same extent as the gap $h_1$ of the first bearing region becomes smaller, the corresponding opposite gap $h_2$ of the second bearing region becomes larger.

The machine tool and its elements are for example made from known and proven materials such as metal (Cr—Ni steel, etc.). Naturally, other ways of producing a machine tool and its elements with other materials are also open to the expert, knowing the present invention.

What is claimed is:

1. Spindle assembly with a spindle shaft (3),
   an adapter for receiving a tool or work piece,
   a motor (1) which serves to drive the spindle shaft (3) whose rotor is mounted only by the spindle shaft,
   with only one bearing (2) for mounting the spindle shaft (3), which has three rows (19, 24, 25) of hydrostatic bearing regions arranged in the circumferential direction,
   wherein two of these three rows (24, 25) are used for axial mounting of the spindle shaft (3) and the third row (19) for radial mounting of the spindle shaft (3).

2. Work spindle according to claim 1, wherein the three rows (19, 24, 25) of hydrostatic bearing regions are arranged immediately adjacent to each other.

3. Work spindle according to claim 1, wherein the three rows (19, 24, 25) of hydrostatic bearing regions can be operated at a speed characteristic of >2.5 million D×n, wherein D is the diameter of the bearing in millimeters and n is the rotational speed of the bearing in revolutions per minute.

4. Work spindle according to claim 1, wherein the three rows (19, 24, 25) of hydrostatic bearing regions are sealed with labyrinth seals (7, 13).

5. Work spindle according to claim 1, wherein the three rows (19, 24, 25) of hydrostatic bearing regions use water as a hydrostatic pressure medium.

6. Work spindle according to claim 1, wherein the three rows (19, 24, 25) of hydrostatic bearing regions are designed such that the hydrostatic pressure medium exhibits turbulent flow.

7. Work spindle according to claim 1, wherein the diameter of the spindle shaft (3) is increased in the region between the bearing (2) and the motor (1).

8. Work spindle according to claim 1, wherein the three regions (19, 24, 25) of hydrostatic bearing regions are prestressed by the hydrostatic pressure medium.

9. Work spindle according to claim 1, wherein, on the spindle shaft (3), in the axial direction in series are arranged the adapter, the bearing (2) and the rotor of the motor (1).

10. Work spindle according to claim 1, wherein the bearing (2) is adapted to describe a movement and allow for precession and nutation.

11. Work spindle according to claim 1, wherein the length of the section of the spindle shaft on which the bearing (2) is arranged is smaller than the region of the spindle shaft which is enclosed by the rotor of the motor (1).

* * * * *